United States Patent [19]

Ito

[11] Patent Number: 4,944,125
[45] Date of Patent: Jul. 31, 1990

[54] FILTERING DEVICE

[75] Inventor: Yoshio Ito, Kurume, Japan

[73] Assignee: Tabai Espec Corporation, Osaka, Japan

[21] Appl. No.: 346,842

[22] Filed: May 3, 1989

[30] Foreign Application Priority Data

May 9, 1988 [JP] Japan .............................. 63-112044

[51] Int. Cl.⁵ .............................................. A01G 9/24
[52] U.S. Cl. .................................. 52/171; 47/DIG. 6; 350/312
[58] Field of Search ...................... 52/171; 47/DIG. 6; 350/312

[56] References Cited

U.S. PATENT DOCUMENTS

| | | |
|---|---|---|
| 2,439,553 | 4/1948 | Winn ........................ 52/171 |
| 3,470,049 | 9/1969 | Reusch ..................... 52/171 |
| 3,695,681 | 10/1972 | Dockery .................. 52/171 |
| 4,044,519 | 8/1977 | Morin ....................... 52/171 |
| 4,093,352 | 6/1978 | Pisar ......................... 52/171 |
| 4,236,360 | 12/1980 | Parrier ..................... 52/171 |
| 4,268,126 | 5/1981 | Mumford ................ 52/171 |
| 4,288,953 | 9/1981 | Whiteford .............. 52/171 |
| 4,380,994 | 4/1983 | Seemann ................. 52/171 |
| 4,561,221 | 12/1985 | McKee .................... 52/171 |

FOREIGN PATENT DOCUMENTS

| | | | |
|---|---|---|---|
| 2522791 | 4/1975 | Fed. Rep. of Germany ........ 52/171 |
| 2007664 | 1/1970 | France ..................... 52/171 |
| 2529993 | 1/1984 | France ..................... 52/171 |
| 53-118826 | 10/1978 | Japan . | |
| 58-107122 | 6/1983 | Japan . | |
| 63-10767 | 5/1988 | Japan . | |
| 63-116625 | 5/1988 | Japan . | |
| 63-116626 | 5/1988 | Japan . | |
| 63-192330 | 8/1988 | Japan . | |
| 699135 | 11/1979 | U.S.S.R. ................. 52/171 |

Primary Examiner—Henry E. Raduazo
Attorney, Agent, or Firm—Armstrong, Nikaido, Marmelstein, Kubovcik & Murray

[57] ABSTRACT

A filtering device for use in shutting out a greater portion of the ultraviolet and infrared rays but admitting the passage of visible lights indispensable to the growth of plants and human life, the device including a mixture and a container for holding the mixture, the mixture containing water, a compound dissociable into ferrous salt ions, and at least one of L-ascorbic acid and D-ascorbic acid, the container comprising transparent members disposed face to face with each other, with the mixture confined therebetween.

17 Claims, 3 Drawing Sheets

FILTERING DEVICE

BACKGROUND OF THE INVENTION

The present invention relates to a filtering device for shutting out rays of the ultraviolet and infrared regions, which are harmful to the growth of plants. The filtering device is also used as windows for buildings and vehicles such as automobiles, trains, and ships. In this specification the percentage is represented in terms of weight unless otherwise indicated.

In general, strong sunlight particularly in summer is harmful to the growth of plants. To avoid damage by sunlight, a cover of gauze is used as a covering or alternatively an air conditioning system is employed to control the build-up of heat in greenhouses.

To avoid sunlight entering cabins and rooms of vehicles and buildings, blinds, curtains or the like are commonly used as shades.

However, the problem of the gauze cover is that it shuts out not only infrared rays but also visible rays which are indispensable to the life of plants. The problem of an air conditioning system is that it is difficult to control the temperatures in the greenhouses adequately. In addition, the air conditioning system is costly in maintenance.

In the case of buildings and vehicles the blinds and curtains may be effective to protect the insides against sunlight but it is a drawback to make the rooms and cabins dark and dim.

Against such background the inventor invented a filtering device which shuts out a greater portion of the infrared and ultraviolet rays but allows the passage of visible rays. The device includes a sealed container, which comprises a pair of transparent panels disposed in parallel, the container containing a mixture of water, a compound which is dissociable into ferrous salt ions, and a reducing agent, which is added to prevent the turbidity of the mixture resulting from the ferrous salt ionization into ferric salt ions. Sulfuric acid ($H_2 SO_4$), uric acid ($C_5 H_4$) or the like is used as a reducing agent, and it has been found that such substance, whichever may be used, presents problems. More specifically, strong acids such as sulfuric acid cause contamination problems when the used filtering device is discarded, and when a substance hard to solve in water, such as uric acid, is used, the filtering device is difficult to make because of the difficult solubility of the substance.

Accordingly, the present invention is to provide a filtering device which shuts out a greater portion of the ultraviolet and infrared rays but allows the passage of visible rays, thereby enabling the filtering device to be applied to the culturing of plants and the indoor lighting in buildings and vehicles.

In order to achieve this object the inventor has made further research and found that when at least one of L-ascorbic acid and D-ascorbic acid is used instead of the reducing agent it prevents the turbidity or undesired coloring caused by the ferrous salt ionization into ferric salt ion. In addition, so long as these substances are in ordinary use, they are unlikely to cause the problem of contamination and involve no difficulty in manufacturing the filtering devices because of the good solubility in water.

SUMMARY OF THE INVENTION

Briefly stated, the filtering device of the present invention comprises a container which contains a mixture of water, a compound dissociable into ferrous salt ions and at least one of L-ascorbic acid and D-ascorbic acid, the container comprising a pair of transparent members disposed face to face with the mixture confined therebetween.

The compounds dissociable into ferrous salt ions can be selected from a variety of compounds which dissociate into ferrous salt ions when they mix with water; typical examples are ferrous salt ($FeSO_2 \cdot 7H_2 O$), ammonium iron sulfate ($Fe(NH_4)_2 (SO_4)_2$) or the like.

The transparent members can be glass panels, or plates or films or a combination thereof, made of transparent plastics having sufficient strength and corrosion-resistance to the above-mentioned mixture; for example, acrylic resin, polycarbonate, polyvinyl chloride, etc. The spacing between the pair of transparent members can be maintained by spacers so as to ensure the confinement of the mixture therein.

The concentration of ferrous salt ions and the quantity of L-ascorbic acid and/or D-ascorbic acid are determined by taking into consideration the atmospheric temperature, the amount of rays and other external conditions anticipated when the filtering device is used. For example, when the water has a temperature of about 20° C., the maximum presence of ferrous salt ions in the water containing the compound is 1.2 M. This corresponds to the cases where when ferrous sulfate is used, the presence thereof in the water containing the ferrous sulfate will be about 33.4%, and where when ammonium iron sulfate is used, the presence thereof in the water containing the ammonium iron sulfate will be about 47.1%. If more of ferrous sulfate and ammonium iron sulfate are to be dissolved in the water, the water must be warmed to more than 20° C. When the water temperature is 20° C., more ferrous sulfate and ammonium iron sulfate cannot be added without disabling the function of the filtering device. To achieve an effective filtering device, the concentration of ferrous salt ions is determined by taking into consideration a lowest atmospheric temperature at places where the filtering device is used.

For example, when the temperature of the water in the filtering device lowers to $-10°$ C., it is noted that ferrous salt begins to precipitate. At this time the molar concentration thereof is about 0.5 M. Therefore it is required to make its concentration lower than 0.5 M.

The turbidity or undesired coloring due to the ferrous salt ionization into ferric salt ions can be prevented by increasing the concentration of L-ascorbic acid and/or D-ascorbic acid to 0.0056 mol or more per 1 mol of ferrous salt ions. In this way, if the temperature of the water lowers to $-10°$ C. with the concentration of ferrous salt ions being 0.5 M, an optimum concentration of ascorbic acid is 0.0028 M. If the concentration of ascorbic acid is lower than 0.0028 M, the degree of shielding near infrared rays is reduced.

Based upon the facts mentioned above it is concluded that the quantity of ferrous salt ions dissolved in the water containing the compound is normally in the range of about 0.1 to about 1.2 M; preferably about 0.2 to about 0.5 M. The compound, which is dissociable into ferrous salt ions, is added in such a manner that the concentration of ferrous salt ions falls in this range. For example, if ferrous sulfate is used, about 2.5 to about 30%, preferably about 5 to about 15% thereof must be present in the water containing the ferrous sulfate. If ammonium iron sulfate is used, about 3 to about 30%, preferably about 5 to about 20% thereof, must be present in the water containing the ammonium iron sulfate.

The mixture contains L-ascorbic acid and/or D-ascorbic acid (both $C_6 H_8 O_4$) in the amount of about 0.01 to about 1.0%, preferably about 0.1 to about 0.5%.

The above-mentioned mixture can contain an antifreezing agent in ordinary use, such as ethylene glycol ($COCH_2 CH_2 OH$) and methyl alcohol ($CH_3 OH$), up to about 30%.

Preferably the water is sterilized by boiling and deaired at vacuum either before or after it is mixed with the ferrous salt ions and the others, so as to avoid undesired effects such as bubbles or turbidity on the mixture while the filtering device is used.

The filtering device of the invention shuts out a greater portion of the ultraviolet and infrared rays, and admit the passage of visible rays, which are indispensable to the growth of plants and human life. The L-ascorbic acid and/or D-ascorbic acid prevent the transparent plates from becoming cloudy by the ferrous salt ionization into ferric salt ions.

DETAILED DESCRIPTION OF THE PREFERRED EMBODIMENTS

Figure 1:
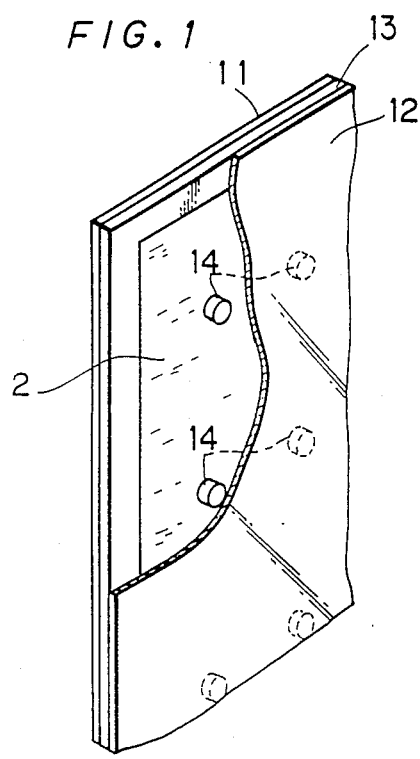
FIG. 1 is a partly broken perspective view showing a filtering device according to the present invention.
Figure 2:
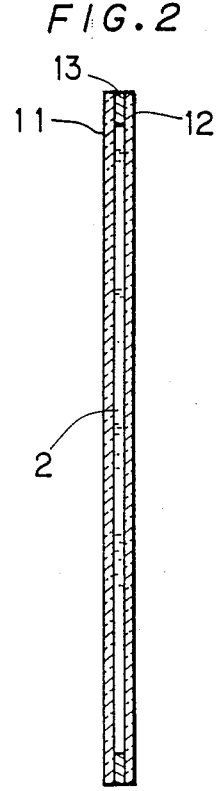
FIG. 2 is a cross-sectional view.

Referring to FIGS. 1 and 2, the filtering device of the present invention includes a pair of transparent panels 11 and 12 disposed in parallel, with a framework 13 sandwiched therebetween. The spacing therebetween is maintained by the framework 13 and spacers 14. In this way the panels 11, 12 and the framework 13 constitute a plate-like container in which a mixture 2 is confined in a liquidtight manner. Each panel 11 and 12 is made of transparent glass, having a thickness of 2 mm. The framework 13 has a thickness of 3 mm so as to produce a spacing between the two panels 11 and 12, and bonded to both panels 11 and 12 by a water-proof adhesive so as to secure the seal. The spacers 14 are also made of transparent glass, and bonded to both panels 11 and 12 or one of them by an adhesive. The confined mixture has a thickness of 3 mm and has the following compositions (% by weight):

water: 65.7%
ferrous sulfate: 13.9%
L-ascorbic acid: 0.4%
ethylene glycol: 20.0%

This mixture contains ferrous salt ions of 0.5 M in concentration owing to the addition of 13.9% ferrous sulfate, and the 0.4% L-ascorbic acid prevents the ferrous salt ions from ionizing into ferric salt ions through reaction with the water, thereby avoiding the undesired coloring of the mixture resulting from ionizing into ferric salt and the cloudiness on the panels 11, 12 resulting from the precipitation of iron content.

The water is sterilized by boiling and deaired before it mixes with ferrous salt ions and others. After it mixes with them, the mixture is sterilized by boiling and deaired before it is confined in the space between the panels 11 and 12. The confinement of the mixture in the container can be carried out in various ways; for example, by injecting through one or more apertures produced in the panels 11 or 12. The apertures are closed to keep the seal of the container.

Figure 3:
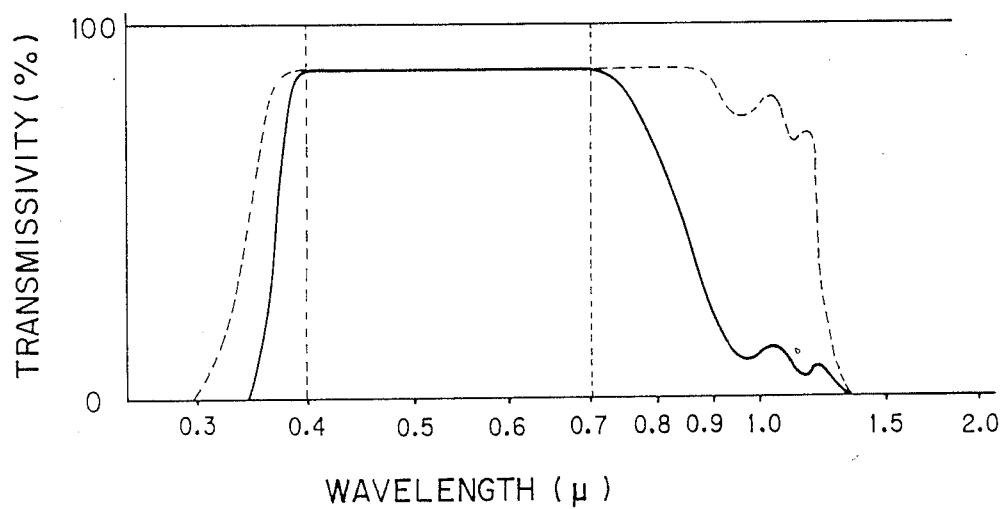
FIG. 3 is a graph showing the permeation characteristic of spectrum obtained through the filtering device of FIG. 1.

The characteristic of sunlight spectrum obtained through the mixture 2 is shown in FIG. 3. Evidently the mixture 2 allows the passage of rays of the visible region, which ranges from about $0.39\mu$ to about $0.7\mu$ in wavelength. The rays of this region are essential to the growth of plants and human life. Whereas, the mixture 2 shuts out a greater portion of the ultraviolet (about $0.39\mu$ or less in wavelength) and infrared (about $0.7\mu$ or more in wavelength) rays, which are harmful to the growth of plants.

FIG. 3 shows comparative data about permeation characteristic between an ordinary water-contained filter and the present invention. The dotted lines shows the data about the water-contained filter which contains water instead of the mixture 2. The graph shows that this water-contained filter allows the passage of a greater portion of the infrared rays (about $0.7\mu$ in wavelength). This means that this filter is not suitable for protecting plants against scorching sunlight.

The filtering device of the present invention was tested on cultivating tomatoes and spinach at sunlight in summer, and the results were compared with those obtained when no filtering device was employed. The results showed that the tomatoes and spinach not only smoothly grew in spite of the scorching weathers but also that they grew more rapidly than the other seasons.

When vegetables are cultivated with the use of the filtering device of the invention, it has been found that the vegetables have full growth, and are tender and less fibrous. The reason is presumably that the vegetables constantly absorb water owing to the filtering device so that they are protected against detrimental build-up of heat and allowed to open their stomas so fully as to let water vapor pass through. As is generally known, water refreshes the cells of plants and keep their tissues in turgescence. In addition, water is essential for effecting photosynthesis, and carries the products of photosynthesis to every part of the tissues. Particularly vegetables need a plenty of water and without it their growth is inhibited.

The filtering device of the invention is also applicable as windows for buildings and vehicles such as automobiles, trains and ships. It prevents ultraviolet and infrared rays from admitting in rooms and cabins. However visible rays are allowed in, thereby saving the cabins and rooms from becoming dark and dim.

Changes and modifications are of course possible within the spirit of the present invention:

For example, the mixture 2 can contain ammonium iron sulfate instead of the ferrous sulfate, and D-ascorbic acid, or alternatively, L-ascorbic acid and D-ascorbic acid in combination instead of the single use of L-ascorbic acid.

For example, the spacing between the panels 11 and 12 can be 3 mm (which means that the thickness of the confined mixture is 3 mm), and the mixture can have the following composition (% by weight):
  water: 60%
  Ammonium iron sulfate: 19.6%
  D-ascorbic acid: 0.4%
  ethylene glycol: 20.0%

The same permeation characteristic of light spectrum was ascertained as that shown in FIG. 3.

Figure 4:
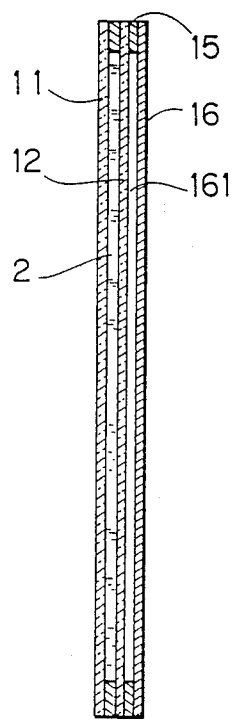
FIG. 4 is a cross-section through a modified version of the filtering device.

The structure of the container can be variously modified as shown in FIGS. 4 to 9:

Referring to FIG. 4, the container comprises three panels 11, 12 and 16. The reference numeral 15 denotes another framework sandwiched between the panels 12 and 16. A space is defined by the panels 12 and 16 in which dry air is confined. The dry air works adiabatic so that the heat in the mixture 2 is prevented from transferring to the panel 16. Hereinafter this air-packed space 161 will be referred to as "adiabatic layer". When this embodiment is particularly suitable for fitting in windows. The reason for using the dry air is that the panels 12 and 16 are kept safe from becoming cloudy with vapor. Instead of the dry air, the adiabatic layer 161 can be evacuated. The embodiment illustrated in FIG. 4 has one adiabatic layer but can have two or more layers.

Figure 5:
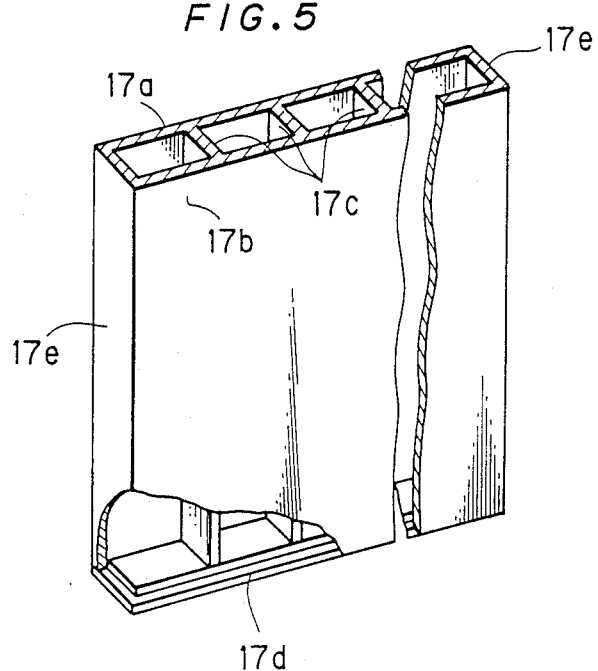
FIG. 5 is a partly broken perspective view showing a modified version of the container.

FIG. 5 shows another example which is molded with transparent plastic extrusions, such as acrylic resin or polycarbonate. The container has a body portion made up in one piece of walls 17a, 17b, 17c and 17e. The inner walls 17c serve as spacers, and each of the top and the bottom open ends is closed by lids 17d in a liquidtight manner. The embodiment shown in FIG. 5 has a lid closing the bottom open end, and a lid closing the top end is omitted to show the internal structure.

Figure 6:
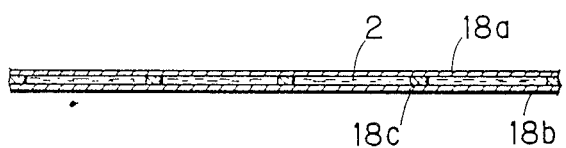
FIG. 6 is a cross-section through a further modified version of the filtering device.
Figure 7:
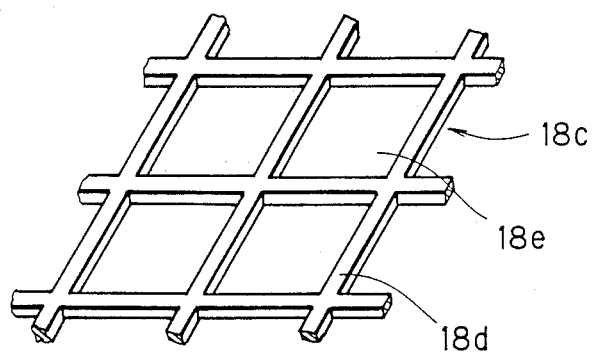
FIG. 7 is a fragmentary perspective view showing a spacer used in the filtering device of FIG. 6.

FIG. 6 shows a container which comprises transparent pliable films 18a and 18b of polyvinyl chloride with spacers 18c, the film having a thickness of about 0.01 to about 0.05 mm. As shown in FIG. 7, the spacers 18c is made of a transparent pliable film of polyvinyl chloride having a thickness of about 0.1 to about 0.5 mm. The reference numeral 18e denotes pores, which have no communication with one another so as to hold the mixture 2 in each pore independently. The spacer 18c is thermally bonded to the films 18a and 18b. The pores 18e can be shaped in various ways, such as a round, a square or a triangular shape.

Figure 8:
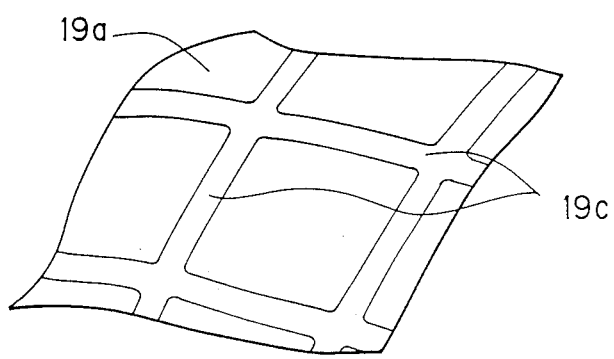
FIG. 8 is a perspective view showing a further modified version of the filtering device.
Figure 9:
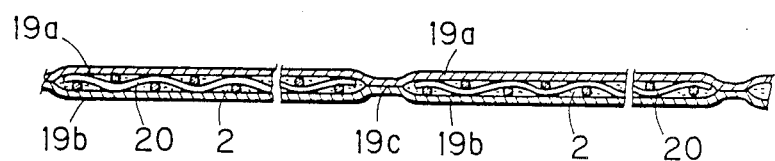
FIG. 9 is a cross-section through the filtering device of FIG. 8.

FIGS. 8 and 9 show a container which comprises films 19a and 19b of the same material as that used for the example of FIG. 6. As shown in FIG. 9, the films 19a and 19b are thermally bonded along line 19c at regular intervals of 30 cm so as to produce independent cells in which the mixture 2 is confined together with spacers 20 of about 2 mm-mesh having a thickness of about 0.1 to about 0.3 mm. The mesh spacers are made of pliable polyvinyl chloride.

What is claimed is:

1. A filtering device comprising a mixture and a container for holding the mixture, the mixture containing water, a compound dissociable into ferrous salt ions, and at least one of L-ascorbic acid and D-ascorbic acid, the container comprising transparent members disposed face to face with each other, with the mixture confined therebetween.

2. A filtering device as set forth in claim 1, wherein the concentration of ferrous salt ions in the water containing the compound is in the range of about 0.1 to about 1.2 M.

3. A filtering device as set forth in claim 1, wherein the compound is ferrous sulfate, and wherein the presence thereof in the water containing the compound is in the range of about 2.5 to about 30% by weight.

4. A filtering device as set forth in claim 1, wherein the compound is ammonium iron sulfate, and wherein the presence thereof in the water containing the ammonium iron sulfate is in the range of about 3.0 to about 30% by weight.

5. A filtering device as set forth in claim 1, wherein the mixture contains at least one of L-ascorbic acid and D-ascorbic acid by about 0.01 to about 1.0% by weight.

6. A filtering device as set forth in claim 1, wherein the mixture contains an antifreezing agent.

7. A filtering device as set forth in claim 1, wherein at least one of the transparent members is a glass panel.

8. A filtering device as set forth in claim 1, wherein at least one of the transparent members is a plastics panel.

9. A filtering device as set forth in claim 1, wherein at least one of the transparent members is a plastics film.

10. A filtering device as set forth in claim 1, further comprising a transparent adiabatic layer attached to at least one of the transparent members.

11. A filtering device as set forth in claim 10, wherein the adiabatic layer includes dry air as an adiabatic medium.

12. A filtering device as set forth in claim 1, wherein the container comprises transparent glass panels, an intermediate framework sandwiched therebetween, and a spacer, the panels being spaced by the intermediate framework and the spacer.

13. A filtering device as set forth in claim 1, wherein the container has a body portion including transparent front and rear walls, side walls and a spacer maintaining the inner space of the body portion, the body portion being molded in one piece with plastics and sealed by lids at the top and bottom ends so that the mixture is confined therein in a liquidtight manner.

14. A filtering device as set forth in claim 1, wherein the transparent members are a pair of plastics films having individually sealed cells formed between the films, and wherein the mixture is held in each cell.

15. A filtering device as set forth in claim 14, wherein the cells are provided by pores produced in an intermediate plastic film thermally bonded to the films such that the pores are sealed by the films so as to secure individually sealed cells.

16. A filtering device as set forth in claim 14, wherein the cells are provided by thermally bonding the pair of plastics films to each other in the form of a lattice.

17. A filtering device as set forth in claim 16, further comprising a mesh spacer in each cell.

* * * * *